United States Patent
Nadal-Linares et al.

(10) Patent No.: US 7,343,854 B2
(45) Date of Patent: Mar. 18, 2008

(54) PLANTAIN PRESS

(76) Inventors: Elizabeth Nadal-Linares, 850 Magie Ave., Elizabeth, NJ (US) 07208; Rafael A. Linares, 850 Magie Ave., Elizabeth, NJ (US) 07208

( * ) Notice: Subject to any disclaimer, the term of this patent is extended or adjusted under 35 U.S.C. 154(b) by 0 days.

(21) Appl. No.: 11/163,011

(22) Filed: Sep. 30, 2005

(65) Prior Publication Data

US 2007/0074632 A1    Apr. 5, 2007

(51) Int. Cl.
*B30B 7/00*    (2006.01)

(52) U.S. Cl. ........................ 100/234; 100/243

(58) Field of Classification Search ............... 100/126, 100/127, 213, 233, 234, 243; 30/144, 279.2; 99/349, 353, 495, 508
See application file for complete search history.

(56) References Cited

U.S. PATENT DOCUMENTS

| | | | |
|---|---|---|---|
| 283,014 A * | 8/1883 | Newman | ............ 100/116 |
| 544,886 A | 8/1895 | Denotovich et al. | |
| 952,519 A * | 3/1910 | Gilchrist | ............ 100/234 |
| 1,557,547 A * | 10/1925 | Anderson | ............ 100/243 |
| 2,004,858 A * | 6/1935 | Farabough | ............ 83/167 |
| 2,638,957 A | 5/1953 | Danielson | |
| 2,692,550 A * | 10/1954 | Smith | ............ 100/213 |
| 2,917,888 A | 12/1959 | Hawley | |
| 3,573,937 A | 4/1971 | Sarna | |
| 3,880,064 A | 4/1975 | Martinez | |
| 3,934,308 A | 1/1976 | Neri | |
| 3,943,602 A | 3/1976 | Siclari | |
| D245,827 S | 9/1977 | Korpi | |
| 4,057,874 A | 11/1977 | Walker, Jr. | |
| 4,106,162 A | 8/1978 | Fournier | |
| 4,180,889 A | 1/1980 | Jofffe | |
| 4,362,497 A | 12/1982 | Lifshitz | |
| 4,516,923 A | 5/1985 | Lifshitz et al. | |
| 4,794,854 A | 1/1989 | Swaim | |
| 5,112,634 A | 5/1992 | Swearingen | |
| 5,165,942 A | 11/1992 | Wadell | |
| D333,759 S | 3/1993 | Ferrin | |
| 5,245,902 A * | 9/1993 | Pereira | ............ 83/435.19 |
| 5,263,408 A | 11/1993 | Blanchet et al. | |
| D343,551 S | 1/1994 | Guarjardo | |
| 5,419,245 A | 5/1995 | Short | |
| D369,948 S | 5/1996 | Tobiasz | |
| D369,949 S | 5/1996 | Bocicaut | |
| 5,873,294 A * | 2/1999 | Sciuto | ............ 83/588 |
| 6,314,874 B1 | 11/2001 | Martorella | |
| 6,347,580 B1 | 2/2002 | Huang | |
| 6,386,854 B1 | 5/2002 | Guss | |
| 6,558,725 B2 | 5/2003 | Giraldo et al. | |
| 6,644,953 B2 | 11/2003 | Kishek | |
| 2001/0031302 A1 | 10/2001 | Balkos et al. | |

* cited by examiner

*Primary Examiner*—Shelley M. Self
(74) *Attorney, Agent, or Firm*—Robert R. Deleault, Esq.; Mesmer & Deleault, PLLC

(57) ABSTRACT

A food press for pressing plantains has a base having an arcuate-shaped side, a press support connected to the base, a pressing mechanism having a first end, a second end, a pressing surface and a handle, the first end of the pressing mechanism being operably connected to the press support, a press plate in communication with the pressing surface of the pressing mechanism, and a food retaining base plate having a first side containing a plurality of edible material recesses, the food retaining base plate having an arcuate-shaped portion where the arcuate-shaped portion is configured to mate with the arcuate-shaped side of the base and positioned to substantially align with the press plate.

16 Claims, 6 Drawing Sheets

Fig. 1 - *Prior Art*

PLANTAIN PRESS

BACKGROUND OF THE INVENTION

1. Field of the Invention

The present invention relates generally to food presses. Particularly, the present invention relates to manually operated food presses for forming patties and the like. More particularly, the present invention relates to food presses for pressing fried green plantains.

2. Description of the Prior Art

Many foods require shape manipulation in the preparation process. Some foods are pressed flat and shaped, such as, for example, pizza dough or cookie dough. Other foods, such as ravioli and turnovers, require more skill to form a particular shape with a stuffing pocket. Still other foods are formed into patties, such as hamburger and other ground meats.

Compressible foods are generally easily formable because of their soft consistency. They are also easy to manipulate by hand because they are formed before the cooking process begins.

U.S. Pat. No. 4,057,874 (1977, Walker) discloses a food pattie molding tool. The tool is in the form of a cylinder that has an open bottom. A piston is slidably disposed within the cylinder and has a pushrod projecting upwardly out of the cylinder which is guided for vertical reciprocating movements. A handle is fastened to the top of the pushrod and a resilient means is provided for biasing the handle and the attached piston upwardly. An elastic enclosure diaphragm is secured across the open bottom of the cylinder to yield and deform into engagement with the interior surface of the cylinder and the under surface of the piston when the tool is pressed downwardly on a quantity of food to mold. When the tool is lifted, the diaphragm returns to its original shape to automatically eject the molded pattie.

U.S. Pat. No. 5,165,942 (1992, Wadell) discloses a machine for forming a pizza shell for a dough mass. The machine has a vertically reciprocably pressing head positioned above a base plate. The machine is automatic and has a conveyor belt that serves as a base plate which passes beneath the pizza pressing head. The pizza pressing head is synchronized to descend and press the pizza dough mass into pizza shells. Positioned around the circumference of the pressing head are a plurality of spaced fingers capable of reciprocating vertically and laterally. The lower ends of the fingers are adapted to press against the border of a pizza shell on the base plate to imitate manual fingertip pressure.

U.S. Pat. No. 5,419,245 (1995, Short) discloses a food press apparatus with a biased press plate. The food press apparatus includes a drive component operatively connected to a frame. The drive component moves a plunger which is operatively connected to a press plate that engages one end of the container. A spring, compressible between the plunger and the press plate, biases the press plate against the container end. A platform for engaging another end of the container is positioned in spaced relationship with the press plate to allow introduction of the container therebetween. As the press plate moves toward the container engaging platform, the food product is compressed therebetween to squeeze liquid from the food product.

U.S. Pat. No. 6,644,953 (2003, Kishek) discloses a hamburger patty making system which includes a housing having a central aperture and a channel extending inwardly thereof in communication with the central aperture. A press has a handle portion with a first end which is hingedly coupled with the housing and a second end. The press includes an upper container portion disposed over the central aperture of the housing in a lowered orientation. A lower container portion is removable received within the central aperture and includes a cup portion adapted for being seated within the central aperture. A piston is removably coupled with respect to the lower container portion and includes an upper circular plate. A lever couples with the piston to facilitate raising and lowering thereof with respect to the upper container portion.

Design patents, D245,827 (1977, Korpi) and D369,948 (1996, Tobiasz), disclose ornamental designs for a hamburg patty press that include a recess and plurality of recesses, respectively, in a hinged compressing device.

Some foods, however, are harder and less compressible or require shape manipulation during the cooking process, i.e. while the food is hot. A plantain is an example of such a food. The plantain is a member of the banana family. While closely related to the common banana, the edible fruit of the plantain has more starch than the banana and is not eaten raw. Plantains are starchy when ripe and are often used in tropical regions in place of potatoes and squashes. Because the plantain has a maximum of starch before it ripens, it is usually cooked green. It may also be dried for later use in cooking and ground for use as a meal.

Fried plantains are a staple food eaten in South and Central America, the Carribean, Africa, Spain (especially the Canary Islands, whose main product is the plantain), and by many Latin-American communities throughout the United States. A pressed sliced round of fried green plantain is referred to as a "toston" in Spanish and is typically made by manually pressing the sliced round of a fried green plantain into a patty.

Tostons are prepared by first removing the peel off a green plantain. Next, it is cut into approximately one to one-and-a-half inch thick round sections. The sections are placed in a frying pan containing oil and heated until the outside is slightly crisp. Next, each round is placed into a press and flattened as desired. This is performed for each round/slice. They are then placed back into the fryer until fully cooked. This can be relatively time consuming when done at home.

Historically, the press used to prepare the plantains is called a "tostonera." One example of a tostonera, for use in the home, is shown in FIG. 1. A tostonera 1 is generally made of wood and has a bottom piece 2 and a top piece 6 joined by a hinge 5. Bottom piece 2 has a circular-shaped recess 3 on a top surface 4 which faces a flat bottom surface 7 of top piece 6. The plantain slice is placed in circular shaped recess 3. Top piece 6 is fabricated such that there is a handle portion 8 protruding forward with which to hold and press top piece 6 down onto bottom piece 2. This device allows the user to press a plantain round into a plantain patty one at a time.

A disadvantage of the "tostonera" is that a great amount of force is required to press the fried green plantain because of the hinge arrangement. In addition, the fried green plantain round pressed at the rear portion of this type of apparatus is typically pressed more than those at the front of the device resulting in an uneven patty. Further, when a batch of plantains, or any food, is being prepared a highly desired characteristic of the batch is that it is evenly and identically cooked. This is difficult to do with a tostonera which presses one item at a time.

A disadvantage that some of the other prior art devices share with the tostonera is that only one item can be pressed at a time which can cause unevenly cooked items in the same batch. Additionally, by only pressing one item at a time the cooking process for a batch of food is relatively long. Another disadvantage of these devices is that the pressing platforms are not removable which makes it more difficult to clean. Still other disadvantages with those devices using a hinge is that the devices place uneven force on different areas of the food and requires great leverage and force to press larger or less compressible pieces of food.

Therefore, what is needed is a food press that provides the ability to press several pieces of edible material at one time. What is further needed is a food press which shortens cooking time. What is still further needed is a press that is easy to clean. What is also needed is a press that will evenly exert force across an entire plate of food. What is still further needed is a press that will exert the force needed to press a variety of food thicknesses and consistencies. What is further needed is a simple, inexpensive food press for making fried plantains for home use.

SUMMARY OF THE INVENTION

It is an object of the present invention to provide a food press that can press up to several pieces of food at one time. It is another object of the present invention to provide a food press that reduces the overall time to cook a batch of food when each item of the food in the batch must be pressed after the food item is partially cooked and before it is completely cooked. It is yet another object of the present invention to provide a food press that is easy to clean. It is a further object of the present invention to provide a food press that will evenly exert force across multiple food pieces at the same time. It is yet a further object of the present invention to provide a food press that can exert the necessary force to press a variety of food thicknesses and consistencies. It is a further object of the present invention to provide a simple, inexpensive and manual food press for home and restaurant use for making fried green plantains.

The present invention achieves these and other objectives by providing a food press having a base, a press support, a pressing mechanism, a press plate, and a food retaining base plate. The base has an arcuate-shaped side to receive the food retaining base plate. The food retaining base plate has a complementary arcuate-shaped portion that mates with the arcuate-shaped side of the base. The arcuate-shaped side of the base may be any size but preferably has a greater than semi-circular shaped arc so that the food retaining base plate can be securely mated and interlocked within arcuate-shaped side of the base. The arcuate-shaped side of the base may also be semi-circular or less in shape so that the food retaining base plate can be slideably engaged with the arcuate-shaped side of the base. Optionally, the arcuate-shaped side of the base may have a retaining member to help support the food retaining plate within the base.

The press support is connected to the base and typically rises out of the plane of the base but may be configured within the plane of the base. Optionally, the press support includes a hand rest for stabilizing the food press while the food press is manually operated. The optional hand rest is preferably a curved, backward protruding palm rest at an upper portion of the press support. The press support may be a separate component that is attached to the base or it may be formed when the base is formed.

The pressing mechanism is connected to the press support and has a portion that presses the press plate against the food retaining base plate. The pressing mechanism includes a lever in the form of a shaped bar that pivotably attaches to the press support at a press support end and to the handle at a handle end. The handle and shaped bar may be integrally made. Between the press support end and the handle end is a pressing surface that is located in a spaced relationship from the press support so that when the handle is lowered the force exerted on the press plate is substantially centered.

The food retaining base plate has a first surface that has a plurality of edible material recesses. Optionally, a second surface may have other edible material recesses with various shapes or sizes or the second surface may be flat. The second surface provides an additional area upon which food can be pressed thus making the food retaining base plate reversible. Food retaining base plate has a base plate side or edge that has a portion configured for mating with the arcuate-shaped side of the base.

In another embodiment of the present invention, the food press has a pressing mechanism that utilizes a rack and a pinion gear combination. In this embodiment, the pressing mechanism contains a housing which has a housing recess that accommodates a rack and a pinion gear in a mating relationship. A pin is typically inserted through the pinion gear, the housing, and the handle to rotatably secure the pinion gear and handle to the housing and to operably connect the pinion gear and the handle.

The press plate is attached to the rack, or to a structure attached to the rack. As the pinion gear rotates, it lowers or raises the rack and, thus, lowers the press plate onto the food retaining base plate. The press plate may be fixedly attached or removably attached to the rack or rack structure to allow for easier cleaning of the press plate. Additionally, the press plate may be an unattached, separate component, in which case the rack or adjoining structure would have a pressing surface in order to press the press plate against the food retaining base plate.

To use the food press, the user places the food to be pressed into the edible material recesses in the food retaining base plate and inserts the arcuate-shaped portion of the food retaining base plate against the arcuate-shaped side of the base. The press plate is sized substantially the same as the food retaining base plate. The press plate is aligned with the food retaining base plate and the user moves the handle which engages the pressing mechanism such that the press plate transmits the force from the user's hand onto the food retaining base plate. When the food is pressed to the desired thickness, the user then returns the handle to its starting position. The food pieces are either removed from the food retaining base plate or the food retaining base plate containing the food pieces is then removed from the base and brought to the next cooking station.

The ability to press multiple pieces at one time and the removability of the food retaining base plate allows for faster cooking time because the user is not impeded by the time needed to press each piece individually. In addition, the removable food retainer base plate allows the user to carry the multiple pieces of food to and from the cooking station on the food retaining plate all at once. This feature and functionality allows for more even and uniform batches of cooked food.

This is especially significant when making fried plantains since fried green plantain rounds can be taken out of the fryer and collected directly onto the food retaining base plate, the food retaining base plate placed into the base and pressed with the press plate by the pressing mechanism. The food retaining base plate is then readily removed from the base, and the flattened plantain patties can then be easily slid off of the food retaining base plate into the fryer for the final round of frying.

Additionally, unlike the prior art tostonera, the present invention presses the fried green plantains more evenly.

DETAILED DESCRIPTION OF THE PREFERRED EMBODIMENT

Figure 1:
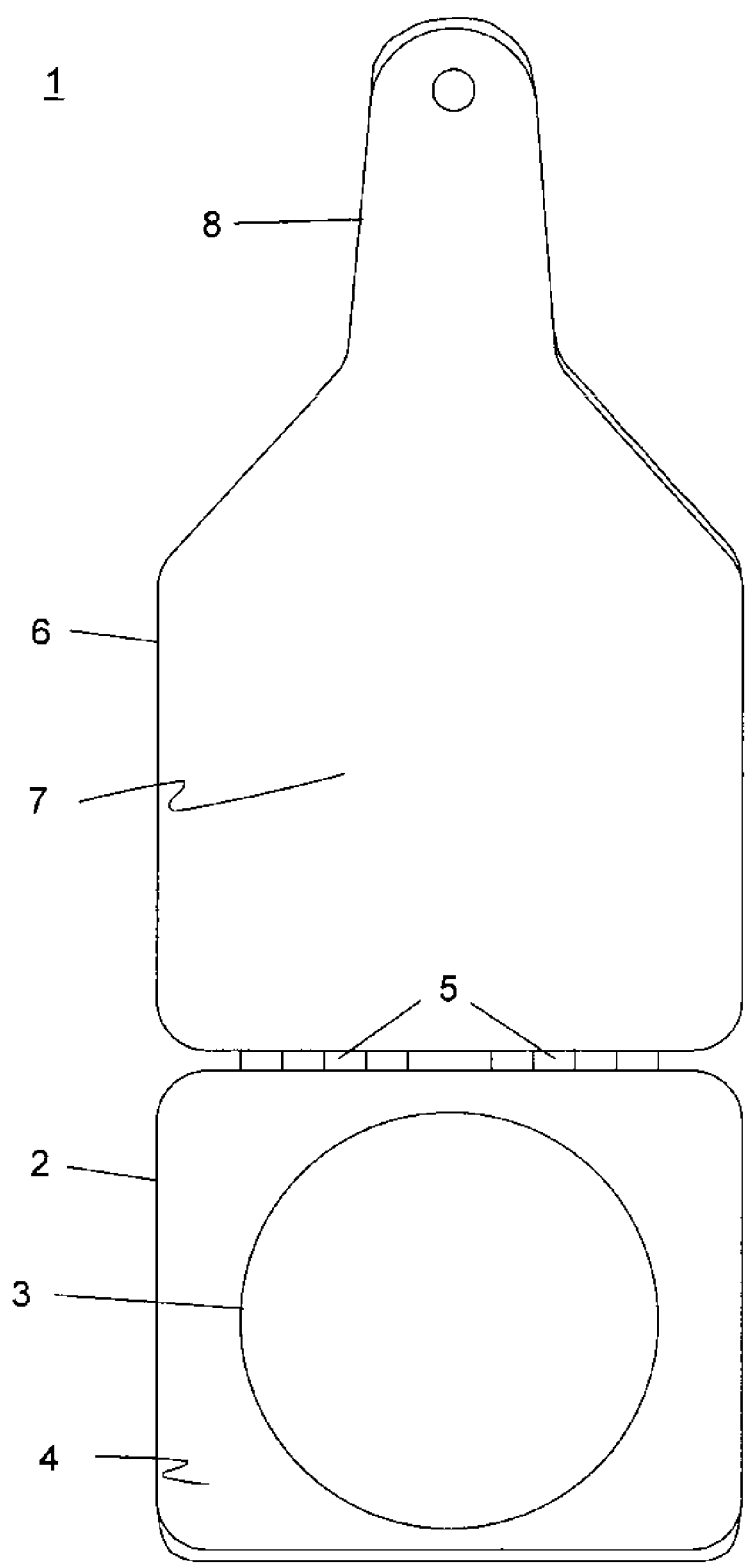
FIG. 1 is a front view of a prior art food press.
Figure 2:
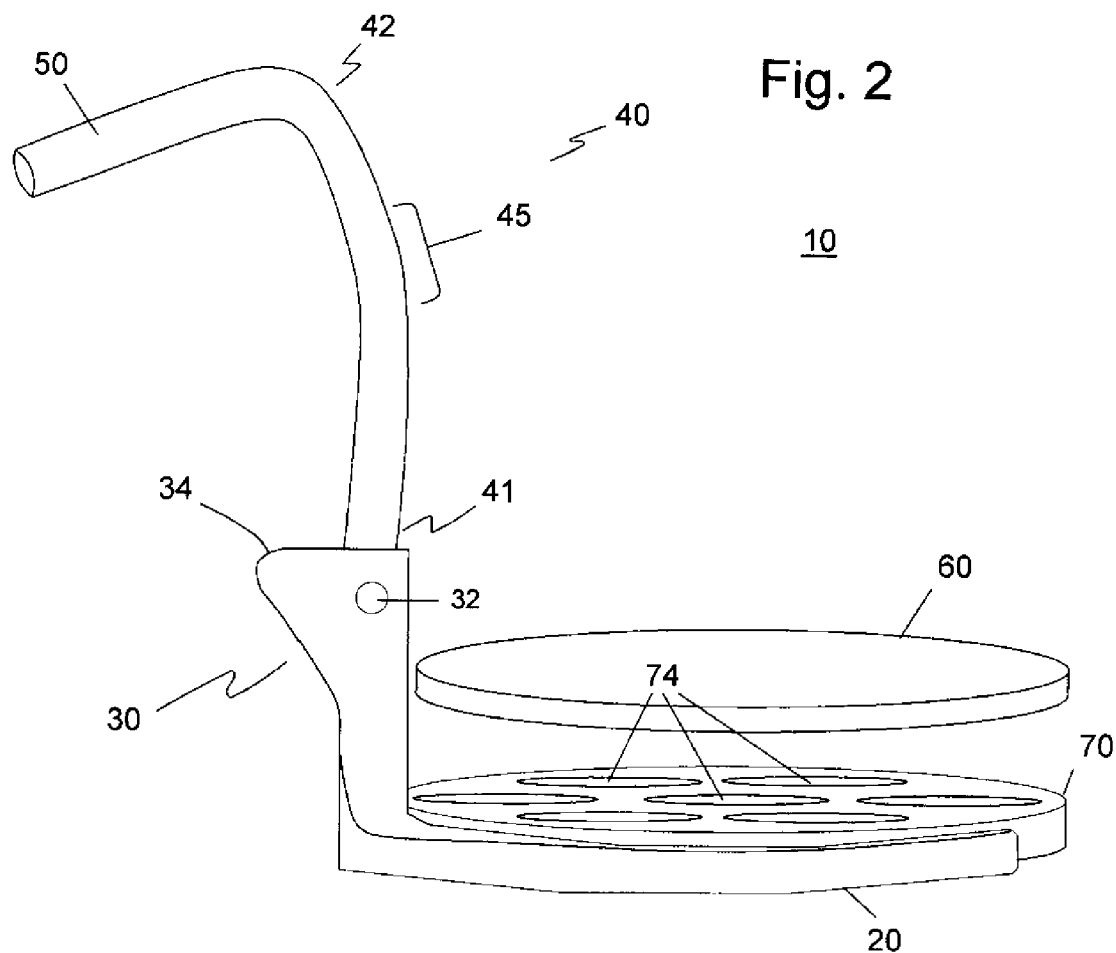
FIG. 2 is a perspective side view of one embodiment of the food press of the present invention.

The preferred embodiment(s) of the present invention are illustrated in FIGS. 2-5. FIG. 2 illustrates a food press 10 having a base 20, a press support 30, a pressing mechanism 40, a press plate 60, and a food retaining base plate 70. Base 20 can be made of any material, such as wood, metal, nonmetal, plastic or other composites. Press support 30 is connected to base 20 and preferably rises out of the plane of base 20. Optionally, press support 30 includes a hand rest 34 for stabilizing food press 10 while being manually operated. The optional hand rest 34 is preferably a curved, backward protruding palm rest at an upper portion of press support 30. Press support 30 may be integrally connected or may be removably connected to base 20 by fastening means, such as rivets, bolts, and pins. In the alternative, press support 30 may be supported by base 20 by a press support receiving opening 22 in base 20.

Figure 2A:
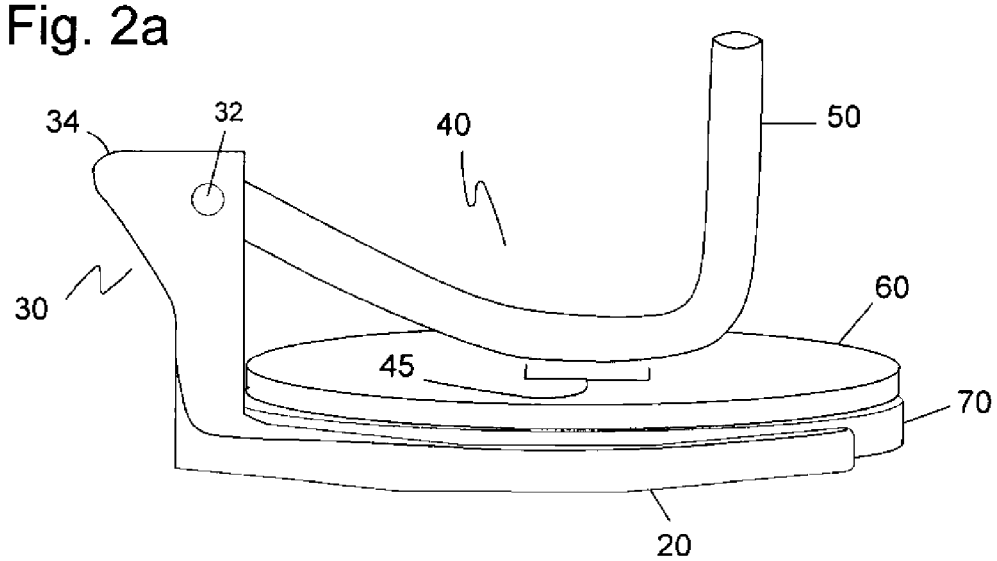
FIG. 2a is a perspective side view of the embodiment in FIG. 2 with the pressing mechanism engaged with the press plate.

Pressing mechanism 40 has a first end 41 and a second end 42. Pressing surface 45 is located between first end 41 and second end 42 of pressing mechanism 40. Pressing surface 45 is the surface portion of press mechanism 40 that engages press plate 60. In this embodiment of pressing mechanism 40, pressing surface 45 is configured to engage press plate 60 around a central portion of its surface (as shown in FIG. 2a) so that the pressing force is applied substantially evenly onto food retaining base plate 70. First end 41 is pivotably connected to press support 30 by pin 32. Handle 50 is fixedly or removably attached to second end 42 of pressing mechanism 40. Handle 50 may be integrally formed with pressing mechanism 40 or attached by any fastening means known in the art. Handle 50 is shown as a stick handle, however, handle 50 may be any shape or design commonly used as handles such as, for example, a T-shaped handle, D-shaped handle, and the like.

Figure 3:
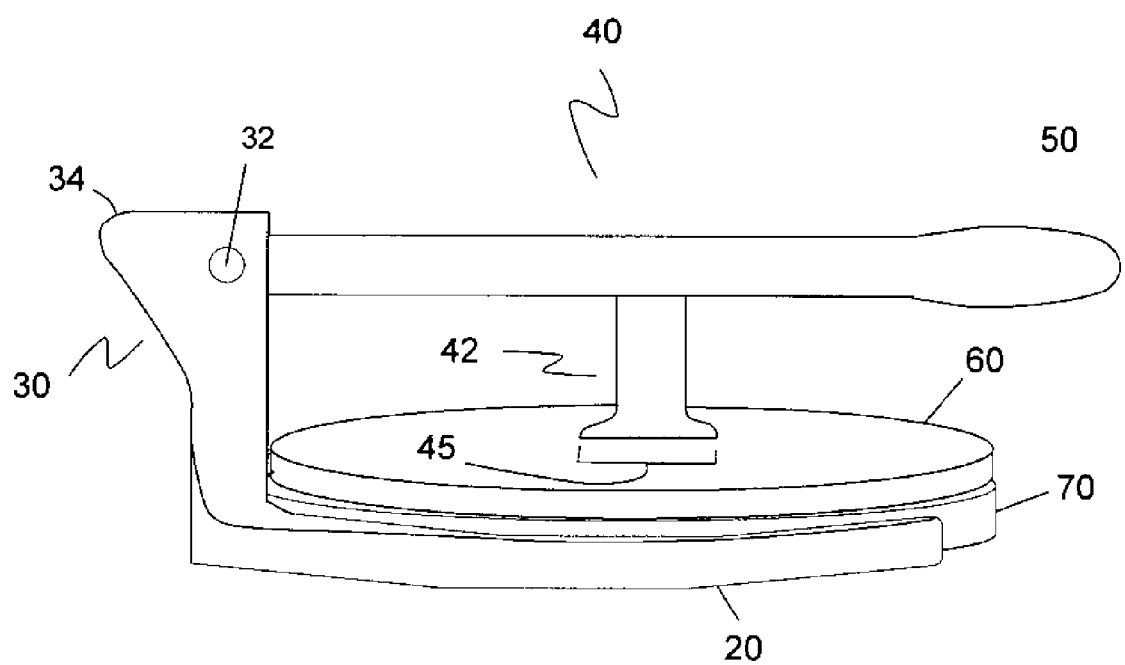
FIG. 3 is a perspective side view of another embodiment of the pressing mechanism of the present invention.

In this embodiment, pressing mechanism 40 is a lever in the form of a shaped bar, preferably a curved bar. It should be understood by one of ordinary skill in the art, however, that the bar can be any shape so long as it has a pressing surface 45 positioned to engage the press plate 60. FIG. 3 is an illustrative example of such an alternative embodiment of pressing mechanism 40. FIG. 3 shows pressing surface 45 as a surface at the end of a pressing bar 42 that extends from pressing mechanism 40 forming a T-shaped configuration.

Press plate 60 in the current embodiment is preferably about 11-inches in diameter and made of an FDA-approved material for food handling, such as, for example, Food Grade High Density Polyethylene. Press plate 60, however, can be made to any size which can be supported by press mechanism 40 and which substantially covers food retaining base plate 70. Additionally, press plate 60 can be made of other materials such as wood, metal, nonmetal, composites, and the like, although FDA-approved materials are preferred.

Figure 4:
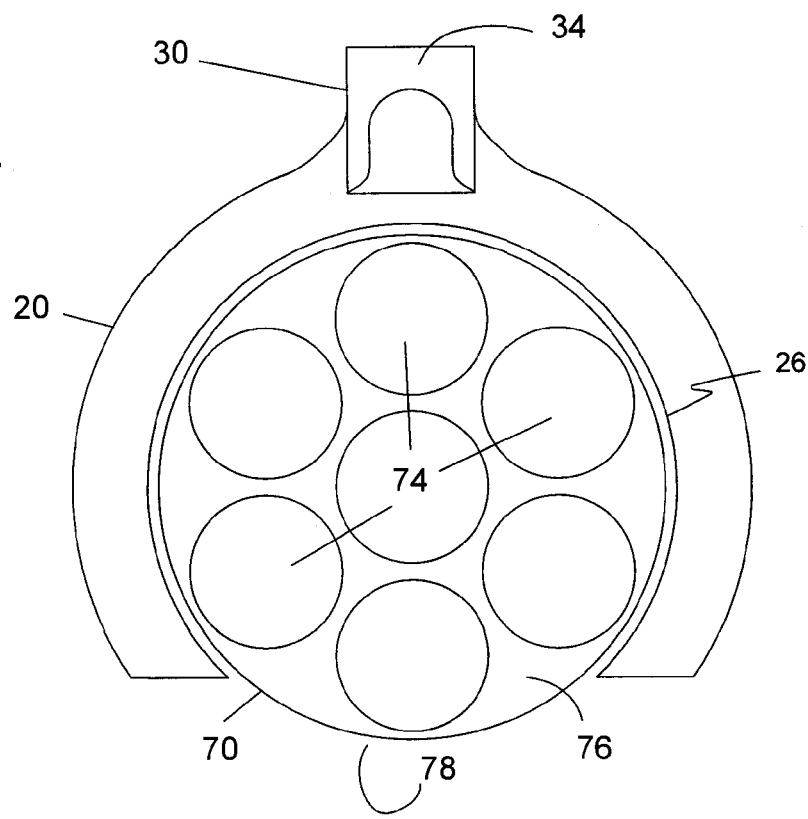
FIG. 4 is a top view of the base and the food retaining base plate of the present invention.

Turning now to FIG. 4, there is shown a top view of the base and food retaining base plate of the present invention with pressing mechanism 40 removed for clarity. Food retaining base plate 70, which has an arcuate-shape that is complementary to arcuate-shaped side 26 of base 20, is positioned against arcuate-shaped side 26. Food retaining base plate 70 is preferably substantially circular in shape which allows for unencumbered placement and removal of food retaining base plate 70 from base 20, but can be any shape so long as it retains an arcuate-shaped portion to fit into arcuate-shaped side 26 of base 20. Food retaining base plate 70 also has edible material recesses 74 on a first side 76. Preferably, food base retaining plate 70 is about 11-inches in diameter and has preferably seven edible material recesses 74, each of which are about 3.5-inches in circumference and about 0.125-inches in depth. Although the preferred configuration and number of recesses was chosen because approximately seven sliced green plantains is the average yield from a typical plantain, the number, size, and shape of the edible material recesses and the food retaining base plate, however, can vary depending on the desired size, shape, and quantity of food to be pressed. Optionally, second side 78 (not shown) can be a flat surface or can contain the same or different number, size, or shape of edible material recesses 74 from that of first side 76 so that food retaining base plate 70 can be used invertibly in base 20.

In this embodiment, arcuate-shaped side 26 forms an arc that is greater than a semi-circle. This particular shape serves to interlock the food retaining base plate 70 within base 20 during use of food press 10 and prevents food retaining base plate 70 from moving during the pressing process. First side 76 of food retaining base plate 70 is shown having a plurality of edible material recesses 74.

Figure 4A:
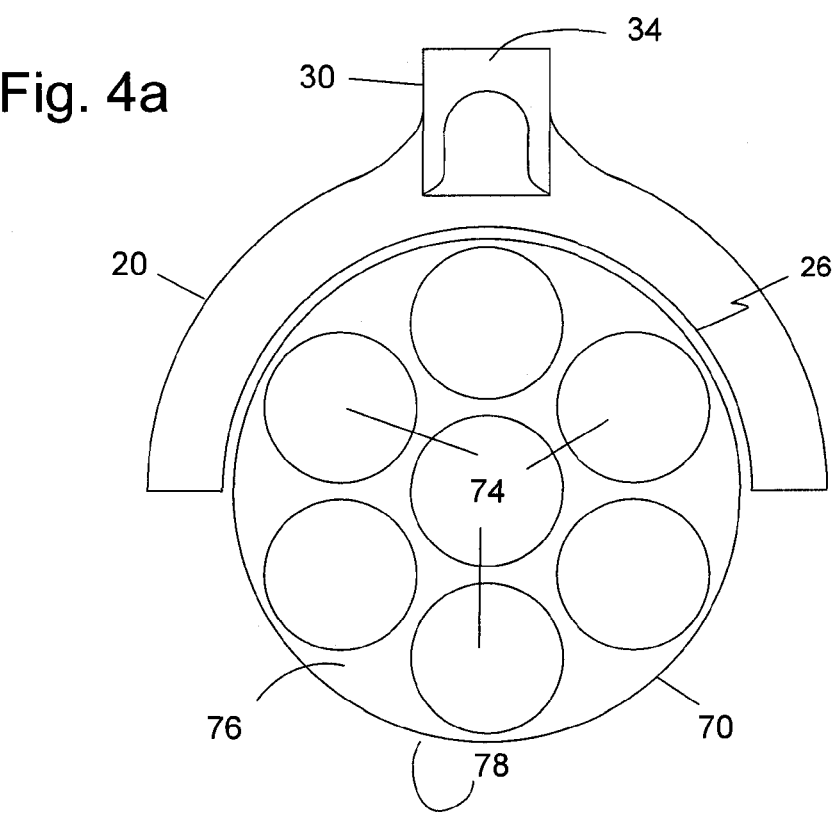
FIG. 4a is a top view of an alternative embodiment of the base and the food retaining base plate of the present invention.

FIG. 4a shows a top view of an alternate embodiment of the base and food retaining base plate of the present invention. Base 20 has arcuate-shaped side 26 which has a semi-circular shape. In this embodiment, food retaining base plate 70 can be slideably engaged against base 20. First side 76 of food retaining base plate 70 is shown having a plurality of edible material recesses 74. Edible material recesses 74 can be any number or size to accommodate the food that is to be pressed.

Figure 4B:
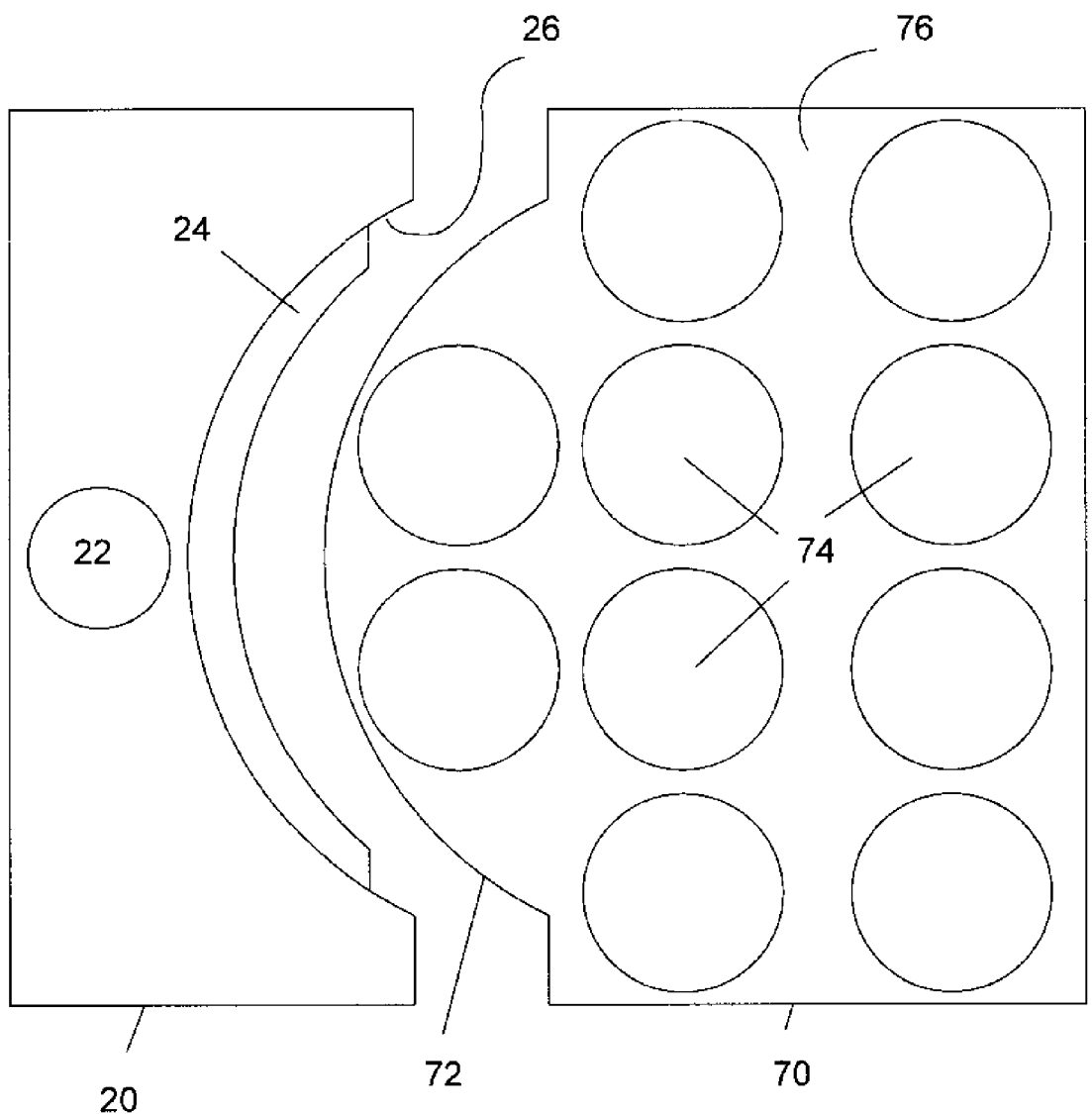
FIG. 4b is a top view of another alternate embodiment of the base and the food retaining base plate of the present invention.

FIG. 4b shows a top view of yet another alternative embodiment of the base and food retaining base plate of the present invention. Base 20 has arcuate-shaped side 26 and is shown with an optional retaining base plate member 24. It is noted that optional retaining base plate member 24 may be incorporated into a base 20 having other shapes and sizes. Food retaining base plate 70 includes an arcuate-shaped portion 72 that is shaped to mate with arcuate-shaped side 26 of base 20. Retaining base plate member 24 may be tabs or a lip to support and secure food retaining base plate 70 to base 20. Retaining base plate member 24 is especially useful in the previously disclosed embodiment of the base 20 having an arcuate-shaped side 26 that is greater than a semi-circle when food press 10 needs to be moved. Retaining base plate member 24 supports and holds food retaining base plate 70 when food press 10 is lifted off of a supporting surface. As illustrated, food retaining base plate 70 has a plurality of edible material recesses 74 on first side 76.

Figure 5:
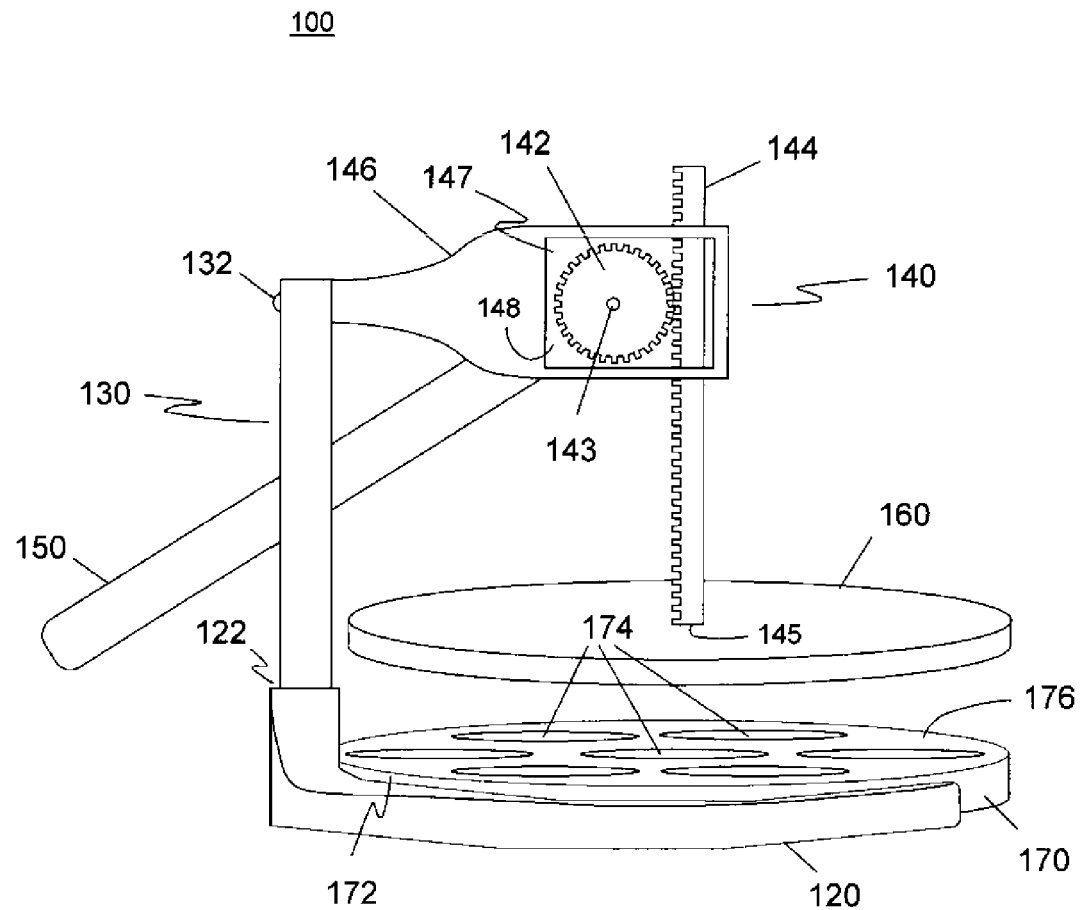
FIG. 5 is a perspective side view of another embodiment of the present invention showing the internal components of the pressing mechanism.

Turning now to FIG. 5, there is illustrated another embodiment of the food press of the present invention. Food press 100 has a base 120, a press support 130, a pressing mechanism 140, a press plate 160, and a food retaining base plate 170. Base 120 is configured to support press support 130. Press support 130 is made of a material having sufficient rigidity to support pressing mechanism 140. Press support 130 may be attached to base 120 in any way by which a support post, tube, channel, and the like, can be held by a supporting base. For example, an opening 122 for slidably receiving or press fitting one end of the press support therein, or it may be connected by bolting, pining, riveting, or other fastening means. Depending on the method of attachment of press support 130 to base 120, press support 130 may be permanently or removably attached to base 120 or press support 130 may be integrally formed with base 120. Pressing mechanism 140 is connected to press support 130.

In this embodiment, pressing mechanism 140 is a rack and a pinion gear combination. Pressing mechanism 140 has housing 146 which is attached to press support 130 by a screw 132. It should be known by those of ordinary skill in the art that housing 146 may be integrally formed with press support 130 or it may be removably attached to press support 130. Housing 146 has a housing recess 147 which is in a spaced relationship with press support 130. Housing recess 147 contains a pinion gear 142 and a rack 144 in a mating relationship. Pinion gear 142 is supported in housing recess 147 by a pin 143 that passes through a wall 148 of housing 146. A handle 150 is secured to pin 143 on the outside of housing 146. It should be understood by one of ordinary skill in the art that any fastening means can be used to hold this configuration together so that pinion gear 142 is operably connected with handle 150 such that moving handle 150 causes pinion gear 142 to rotate. The rotation of pinion gear 142 causes rack 144 to move up or down depending on the direction handle 150 is moved.

Press plate 160 is attached to rack 144. Optionally, rack 144 is removable for easy cleaning. Press plate 160 may also be removably connected to rack 144, removably connected to a structure (not shown) connected to rack 144, or not connected at all. In the embodiments where press plate 160 is removably connected to rack 144 or a structure connected to rack 144, this may be accomplished by using a snap fitting or other mating/receiving mechanism. For example of a mating/receiving mechanism, one component of the mating/receiving mechanism would be located on rack 144 or on the attached structure, and the other component of the mating/receiving mechanism would be located on press plate 160.

In the embodiment where press plate 160 is a separate, unconnected plate, rack 144 would have a pressing surface 145. Pressing surface 145 presses against press plate 160 and transmits the pressing force onto food retaining base plate 170 when rack 144 is lowered. As disclosed in previous embodiments, food retaining base plate 170 has an arcuate-shaped portion 172 which is complementary to arcuate-shaped side 126 of base 120. Food retaining base plate 170 also has edible material recesses 174 on first side 176.

To use the plantain press 10 of the present invention, the user places fried green plantains to be pressed into edible material recesses 74 on food retaining base plate 70 and inserts the arcuate-shaped portion 72 of food retaining base plate 70 against arcuate-shaped side 26 of base 20. Press plate 60 is aligned with food retaining base plate 70 and the user then moves handle 50 which engages pressing mechanism 40 such that press plate 60 exerts force on food retaining base plate 70. When the fried green plantains are pressed to the desired thickness the user then returns handle 50 to its starting position to lift pressing mechanism 40. Food retaining base plate 70 can then be removed from base 20 and the flattened plantain patties can then be easily slid off the food retaining base plate 70 into the fryer for a final round of frying.

Although the preferred embodiments of the present invention have been described herein, the above description is merely illustrative. Further modification of the invention herein disclosed will occur to those skilled in the respective arts and all such modifications are deemed to be within the scope of the invention as defined by the appended claims.

What is claimed is:

1. A food press comprising:
a base having an arcuate-shaped side;
a press support connected to said base;
a pressing mechanism having a first end, a second end, a pressing surface and a handle, said first end of said pressing mechanism being operably connected to said press support;
a press plate in communication with said pressing surface of said pressing mechanism; and
an easily removable food retaining base plate having a first side containing a plurality of edible material recesses, said food retaining base plate having an arcuate-shaped portion wherein said arcuate-shaped portion is configured to temporarily mate without the use of fasteners with said arcuate-shaped side of said base to prevent movement of said food retaining base plate during use of said food press and to substantially align said food retaining base plate with said press plate, wherein said arcuate-shaped portion of said food retaining base plate and said arcuate-shaped side of said base are complimentary.

2. The food press of claim 1 wherein said press plate is connected to said pressing surface of said pressing mechanism.

3. The food press of claim 1 wherein said press plate is removably connected to said pressing mechanism.

4. The food press of claim 1 wherein said pressing mechanism is a lever.

5. The food press of claim 1 wherein said pressing mechanism further includes a housing containing a rack and a pinion gear combination.

6. The food press of claim 1 wherein said arcuate-shaped side of said base has a retaining member to support said food retaining base plate when said food retaining base plate is positioned against said arcuate-shaped side of said base.

7. The food press of claim 1 wherein said press support includes a hand rest.

8. The food press of claim 1 wherein said arcuate-shaped portion of said food retaining base plate removably interlocks with said arcuate-shaped side of said base.

9. The food press of claim 1 wherein said food retaining base plate has a second side usable as a edible material receiving surface whereby said second side of said food retaining base plate is opposed to said press plate and positioned against said base.

10. An apparatus for pressing fried plantains, said apparatus comprising:

a plantain press having a base with a shaped side, a press support connected to said base, and a pressing mechanism having a pressing surface and a handle, said pressing mechanism being connected to said press support and structured to operably press a plurality of said fried plantains at one time;

a press plate in communication with said pressing surface of said pressing mechanism; and an easily removable plantain retaining base plate having a first side containing a plurality of plantain receiving recesses, said plantain retaining base plate having a shaped side portion wherein said shaped side portion is configured to temporarily mate without the use of fasteners with said shaped side of said base and to substantially align said plantain retaining base plate with said press plate, wherein said shaped side portion of said plantain retaining base plate and said shaped side of said base are complimentary.

11. The apparatus of claim 10 wherein said pressing mechanism is a lever.

12. The apparatus of claim 10 wherein said pressing mechanism further includes a housing containing a rack and a pinion gear combination.

13. The apparatus of claim 10 wherein said shaped side of said base has a retaining member to support said plaintain retaining base plate when said plaintain retaining base plate is positioned against said shaped side of said base.

14. The apparatus of claim 10 wherein said shaped side portion of said plaintain retaining base plate removably interlocks with said shaped side of said base.

15. The apparatus of claim 10 wherein said plaintain retaining base plate has a second side usable as a edible material receiving surface whereby said second side of said plaintain retaining base plate is opposed to said press plate and positioned against said base.

16. The apparatus of claim 10 wherein said press support includes a hand rest.

* * * * *